(No Model.)
G. RAMSDELL.
APPARATUS FOR MANUFACTURING WOOD GAS.
No. 267,933. Patented Nov. 21, 1882.
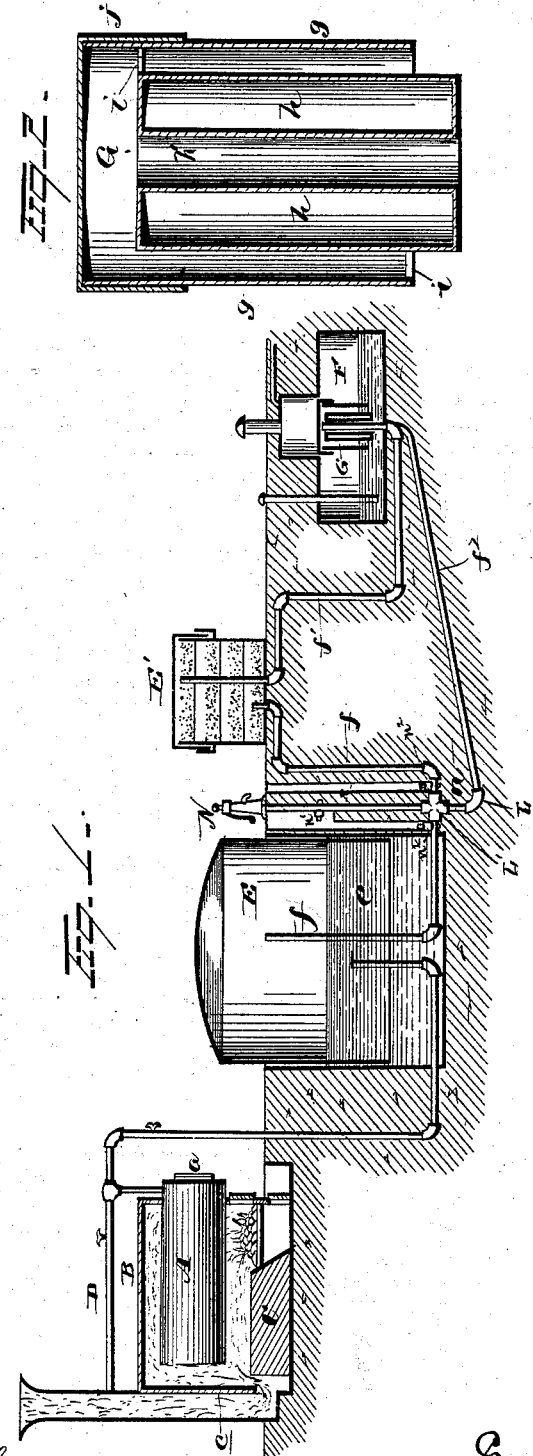

UNITED STATES PATENT OFFICE.

GEORGE RAMSDELL, OF OSWEGO, NEW YORK.

APPARATUS FOR MANUFACTURING WOOD-GAS.

SPECIFICATION forming part of Letters Patent No. 267,933, dated November 21, 1882.

Application filed October 14, 1881. (No model.)

*To all whom it may concern:*

Be it known that I, GEORGE RAMSDELL, of Oswego, in the county of Oswego and State of New York, have invented certain new and useful Improvements in Apparatus for Manufacturing Wood-Gas; and I do hereby declare the following to be a full, clear, and exact description of the invention, such as will enable others skilled in the art to which it pertains to make and use the same.

My invention relates more particularly to an improvement on Patent No. 149,060, granted to me for an improvement in the process and apparatus for manufacturing wood-gas; and it consists in certain details in construction and combinations of parts, as will be more fully explained, and pointed out in the claims.

In the drawings, Figure 1 represents a longitudinal sectional view of the apparatus used in manufacturing the wood-gas or gas from vegetable substances; and Fig. 2 is a vertical section of the float employed in the carbureting-chamber.

A represents the retort, provided with a close door, $a$, and situated in a chamber or furnace, B. A wall, C, of masonry, and a partition-wall, $c$, adjacent to the smoke-stack, serve to cause the products of combustion to circulate freely around the retort A, and to expend the greatest amount of heat thereon before escaping through the smoke-flue.

D is a pipe, communicating with the retort A, through which the gaseous products are conveyed from the said retort through the water $e$ to the gas-holder E, which latter is of the ordinary construction, being open at the bottom and floated in a tank of water. The gaseous products after leaving the retort A are admitted into this water at the bottom of the tank and bubble through it, by which procedure it is thoroughly washed and cleansed of impurities.

The gas-holder E, together with the retort and furnace and their connections, are in general structure like those shown, described, and claimed in the patent before referred to, and require no special description here, except to give a correct understanding of the entire apparatus required for the manufacture of the gas.

The gaseous products collecting in the upper part of the holder E are conveyed through the pipe $f$, that projects above the water $e$, into any suitably-constructed lime-purifier E', which thoroughly cleans and dries it, and admirably adapts it for use in gas-engines, as it is exceedingly cheap and does not foul or clog the cylinder, and in this condition it may also be used for heating and lighting purposes, with or without the carbon, which latter is taken up in passing through the carbureter. After the gaseous products have passed through the purifier E' they are carried through the pipe $f''$ into a carbureting-chamber, F. The pipe $f''$, as it enters the chamber F, passes up through the hydrocarbon contained in the said chamber into a float, G. This float G consists of an outer cylinder, $g$, open at both ends, and provided with a tight-fitting removable cover, $j$, and a closed air-chamber of smaller size than the said outer cylinder, $g$, situated inside of the said outer cylinder, and separated therefrom by the fingers or lugs $i$ which hold the said air-chamber in position, with an annular space between it and the said outer cylinder, through which the gaseous products flow downward after leaving the pipe $f'$. This internal air-chamber, $h$, is provided centrally with a pipe, $h'$, running vertically through the same, in which the pipe $f'$ terminates, and which conducts the gaseous products after they leave the said pipe $f'$ up to the space over the air-chamber and under the removable cover $j$. The lower end of this float is submerged in the hydrocarbon, and the gaseous products, in their descent after leaving the pipe $h'$, of necessity have to pass through this hydrocarbon, where it is enriched by taking up carbon.

The air-chamber $h$ can, if desired, be adapted to extend down below the outer cylinder, as shown in the drawings; but it answers its purpose equally as well if discontinued on a line with the said outer cylinder. Better results are attained by the use of the present construction of float over that shown in Patent No. 149,060, as the air-space shown in said patented float has no bottom, and the air is liable to escape therefrom, which would sink the float and render it useless until repaired. Again, the tubes communicating with the space above the dome-shaped partition in the said patent being restricted in size are liable at any time to become clogged or choked up, which would prevent the free escape of the confined products. With the present construction of float these difficulties are obviated, as it is impossible for the float to sink, as the air is confined in a closed chamber, while the annular space around the said air-chamber is of such size and shape as to preclude the possibility of becoming clogged.

Instead of using two drip-boxes, as shown in the previous patent, I have dispensed with the one under the hydrocarbon-chamber, and instead thereof use one under the pump N, consisting of an elbow coupling-piece, L, which rests under the pump N, and is connected thereto through the intervention of the four-way pipe or cross L'. The horizontal arms of this four-way pipe L' are connected to the adjacent ends of the section forming the pipe $f$, while the vertical arms thereof are adapted to connect the drip-box with the pipe $n$. By connecting the cross L' with the pipe $f$, the drip that settles on the pipe $f$ before reaching the purifier is caused to flow down in the coupling L without passing through the said purifier, while the pipe $f^2$ conveys back the drip that forms after the gas has passed through the purifier.

Suitable valves or cocks, $n'$, can be secured to the pipe $n$ to prevent the gas from passing out through the pump N while the latter is at rest; and suitable valves or cocks, $n^2$, can be secured to the pipes $f$ to prevent the gas from being drawn from the gas holder and purifier while the pump is being worked.

It is evident that slight changes in construction of the float and the arrangement of the different parts might be resorted to without departing from the spirit of my invention, and hence I would have it understood that I do not limit myself to the exact construction shown and described, but consider myself at liberty to make such changes as come within the spirit and scope of my invention.

I am aware that various arrangements of pipes have heretofore been used for connecting and affording communication between the chambers of gas apparatus. I am also aware that cylindrical floats having pipes extending centrally through them, and provided with distributing-pipes to pass the air through the hydrocarbon, are not broadly new. Hence I make no claim to such features of construction; but

What I claim as new, and desire to secure by Letters Patent, is—

1. A float consisting of an outer cylinder having an open bottom and a removable cover secured to the top of the cylinder, an air-chamber arranged within the outer cylinder and closed at its top and bottom and secured to said outer cylinder by means of lugs, so as to leave an annular space between said chamber and outer cylinder, and a central pipe extending through said air-chamber and communicating with the upper end of the outer cylinder to receive the pipe for conveying gas to the float, substantially as set forth.

2. The combination, with the pipe $f^2$, having the elbow-coupling L, operating as a drip-box, secured thereto, and a pump, N, communicating therewith through the pipe $n$, of the pipe $f$, four-way coupling L', lime-purifier pipe $f'$, and a hydrocarbon-chamber, F, in which the pipe $f'$ terminates, substantially as set forth.

3. The combination, with the pipes $f$ and $f^2$, the latter being provided with the drip-box L, the pipe $n$, and pump N, of the four-way pipe L', interposed between and connecting the said pipes $f$, $n$, and $f^2$, substantially as set forth.

In testimony whereof I have signed this specification in the presence of two subscribing witnesses.

GEORGE RAMSDELL.

Witnesses:
 JOSEPH OWEN,
 J. D. MACFARLANE.